(12) United States Patent
Chen et al.

(10) Patent No.: US 11,407,889 B2
(45) Date of Patent: Aug. 9, 2022

(54) POLYMER AND PREPARATION METHOD AND APPLICATION THEREOF

(71) Applicant: SHENZHEN UNIVERSITY, Shenzhen (CN)

(72) Inventors: Shaojun Chen, Shenzhen (CN); Heng Chen, Shenzhen (CN); Junxian Huang, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 0 days.

(21) Appl. No.: 17/150,831

(22) Filed: Jan. 15, 2021

(65) Prior Publication Data

US 2021/0230419 A1 Jul. 29, 2021

Related U.S. Application Data

(63) Continuation-in-part of application No. PCT/CN2019/078893, filed on Mar. 20, 2019.

(51) Int. Cl.

| | | |
|---|---|---|
| *C08L 33/12* | (2006.01) | |
| *C08F 220/58* | (2006.01) | |
| *C08F 226/06* | (2006.01) | |
| *C08F 6/28* | (2006.01) | |
| *C08F 220/36* | (2006.01) | |
| *C08J 5/18* | (2006.01) | |

(52) U.S. Cl.
CPC ............... *C08L 33/12* (2013.01); *C08F 6/28* (2013.01); *C08F 220/36* (2013.01); *C08F 220/58* (2013.01); *C08F 226/06* (2013.01); *C08J 5/18* (2013.01); *C08L 2201/08* (2013.01); *C08L 2201/10* (2013.01); *C08L 2203/16* (2013.01)

(58) Field of Classification Search
CPC .. C08L 33/12; C08L 2203/16; C08L 2201/08; C08L 2201/10; C08F 220/58; C08F 226/06; C08F 6/28; C08F 220/36; C08J 5/18
See application file for complete search history.

(56) References Cited

U.S. PATENT DOCUMENTS 4,178,303 A 12/1979 Lorenz et al.

FOREIGN PATENT DOCUMENTS

| CN | 10-1044175 A | * | 9/2007 | ............ C08F 220/14 |
|---|---|---|---|---|
| CN | 101044175 A | | 9/2007 | |
| CN | 105418642 A | | 3/2016 | |
| CN | 109438479 A | | 3/2019 | |
| JP | H03281685 A | | 12/1991 | |
| WO | 2015003987 A1 | | 1/2015 | |
| WO | WO 2015/003987 A1 | * | 1/2015 | ............... A61K 8/25 |

OTHER PUBLICATIONS

PCT International Search Report and Written Opinion of the International Searching Authority for PCT/CN2019/078893, dated Dec. 18, 2019, 4 pages.

* cited by examiner

*Primary Examiner* — Robert D Harlan

(74) *Attorney, Agent, or Firm* — Dinsmore & Shohl LLP

(57) ABSTRACT

Provided are a polymer having ultraviolet absorption functionality and preparation method thereof; specifically, three monomers having different ultraviolet absorption bands are used for copolymerization, achieving a significant expansion of the ultraviolet absorption range and achieving the effect of full-band ultraviolet shielding. The obtained polymer film has strong visible light transmittance, fluorescence, easy processing, excellent stability, and remarkable ultraviolet shielding performance, and can be broadly applied in such areas as aviation, construction, agriculture, and optical devices.

9 Claims, 4 Drawing Sheets

POLYMER AND PREPARATION METHOD AND APPLICATION THEREOF

CROSS-REFERENCE TO RELATED APPLICATION

The present application is a continuation-in-part of International Application No. PCT/CN2019/078893, entitled "POLYMER AND PREPARATION METHOD AND APPLICATION THEREOF" and filed on Mar. 20, 2019, which is incorporated by reference herein in its entirety.

TECHNICAL FIELD

The present invention relates to the field of polymers, and particularly relates to a polymer with an ultraviolet absorption function and a preparation method and an application thereof.

BACKGROUND

Ultraviolet light is an invisible light with a wavelength in the range of 10-400 nm and a very high energy. Ultraviolet light can be subdivided into three parts: UVA (320-400 nm), UVB (280-320 nm) and UVC (100-280 nm). UVC can be blocked by the ozone layer, however, due to continuous expansion of ozone hole in recent years, the intensity of UVC irradiated by the sun on the earth's surface is also increasing. The energy of ultraviolet light is enough to destroy many chemical bonds in the material, initiate a photochemical reaction, cause the break of molecular chain in the material and decomposition of the compound, and affect the mechanical properties and service life of the material. In addition, active free radicals on the broken molecular chain will also undergo a photo-oxidation reaction with oxygen in the air, making the material yellow and affecting its appearance. A large number of studies have shown that excessive ultraviolet radiation not only has a certain negative impact on various materials, but also causes varying degrees of damage to the organism, such as skin being suntanned and sunburned, and increasing the incidence of skin cancer, cataracts and other diseases.

Poly (methyl methacrylate) is an important class of engineering plastics. It has the advantages of high light transmittance, easy processing, good weather resistance, etc., and is widely used in aviation, construction, agriculture, optical devices and other fields. However, poly (methyl methacrylate) has poor UV shielding performance, which limits its further application in actual production and life. The development of UV shielding materials based on poly (methyl methacrylate) has become a research hotspot and has attracted the attention of many scientific researchers.

At present, the method for improving the ultraviolet shielding performance of poly (methyl methacrylate) is usually doping with ultraviolet absorbers. There are two types of ultraviolet absorbers. One is inorganic ultraviolet absorbers, mainly mica, talc, carbon black, and metal oxides such as $TiO_2$, CeO, ZnO, etc. They have broad absorption in the ultraviolet band and have good stability. However, inorganic ultraviolet absorbers have poor compatibility with poly (methyl methacrylate), and the transparency of the system is easily reduced after forming film. In addition, migration, blooming, etc. will also occur during long-term use, which will affect the service life of the material. The other type is organic UV absorbers, mainly comprising organic compounds such as salicylate, cinnamate, benzophenone, benzotriazole, triazine, and substituted acrylonitrile. Organic ultraviolet absorbers can achieve ultraviolet absorption through light absorption. They usually have special chromophores and auxochromes, which can strongly absorb a certain band of ultraviolet lights and convert the absorbed ultraviolet lights into heat, fluorescence or phosphorescence, thereby achieving the goal of absorbing ultraviolet lights.

With the widespread use of organic UV absorbers, many researchers have modified the UV absorbers by using aliphatic chains to improve their compatibility with poly (methyl methacrylate). However, traditional physical blending method will reduce the mechanical properties of poly (methyl methacrylate), and these small molecular UV absorbers will easily escape from the substrate during high temperature processing, reducing the UV shielding performance of the finished product and causing raw materials waste.

How to prepare polymer ultraviolet shielding materials with good compatibility, excellent stability, long service life and high ultraviolet shielding efficiency has become one of the technical problems that researchers are committed to solving.

SUMMARY

Technical Problem

The object of the present invention is to provide a polymer and a preparation method thereof, so as to solve the technical problems of poor compatibility, poor stability, short service life and low ultraviolet shielding efficiency of conventional ultraviolet absorbing polymer materials.

Another object of the present invention is to provide a polymer film and a preparation method thereof, so as to solve the problems of insufficient mechanical properties, great difficulty in processing, insufficient UV shielding range, and low efficiency of the current polymer film.

Technical Solution

In order to achieve the above object of the invention, in one aspect, the present invention provides a polymer, wherein the polymer is made by polymerization of methyl methacrylate, ethylene glycol pyridone acid methacrylate, and methyl 4-methacrylamido benzoate in a mass ratio of 1:(0.01-10):(0.01-10).

In another aspect, the present invention provides a polymer film processed from said polymer.

In yet another aspect, the present invention provides a method for preparing said polymer, comprising the following steps:

dissolving methyl methacrylate, ethylene glycol pyridone acid methacrylate, methyl 4-methacrylamido benzoate and a trace amount of initiator according to the mass ratio 1:(0.01-10):(0.01-10) in a solvent to carry out polymerization reaction, and separating and purifying the copolymer.

Preferably, the temperature of the polymerization reaction is in a range from 50° C. to 100° C.

Preferably, the reaction time of the polymerization reaction is in a range from 2 h to 36 h.

Preferably, the initiator comprises one or more of cyclohexanone peroxide, benzoyl peroxide, lauroyl peroxide, cumyl hydroperoxide, dicyclohexyl peroxydicarbonate, potassium persulfate, ammonium persulphate, azodiisobutyronitrile.

Preferably, the solvent comprises one or more of acetone, ethanol, dichloromethane, ethyl acetate, tetrahydrofuran, toluene.

Preferably, the protective gas comprises one or more of carbon dioxide, nitrogen, argon.

Preferably, the separation and purification treatment comprises any one or more of concentration, dissolution-precipitation, water washing, centrifugation and suction filtration.

In another aspect, the present invention provides a method for preparing said polymer film, comprising the following steps:

dissolving said polymer in a solvent to obtain a solution; and pouring the obtained solution into a container, and drying at 25-60° C. for 8-24 h to obtain the film.

Preferably, the solution has a concentration of ranging from 1 wt % to 30 wt %.

Use of said polymer in the preparation of ultraviolet shielding materials or devices.

Technical Effect

Compared with existing products, the polymer of the present invention has the advantages of more uniform texture and performance, higher ultraviolet shielding efficiency, more comprehensive range, and better mechanical properties.

The polymer film is made of the polymer material, so that the polymer film has better ultraviolet shielding performance. For example, the ultraviolet lights are almost completely shielded in the range of 200-400 nm. That is, the polymer film has higher efficiency, wider shielding range, uniform texture, and better mechanical performance, which enables the film to achieve the same shielding effect in the case of a thinner thickness, thus saving more raw materials and costs, having a wider range of application.

The method for preparing the polymer adopts specific monomer polymerization, which saves raw materials and simplifies the preparation steps under the premise of ensuring the performance. It is easier to process because of uniform texture of a single polymer, and the prepared polymer has higher UV shielding efficiency, wider range, uniform texture, easy to process, and better mechanical properties.

The same method for preparing the polymer film, due to the use of the polymer, can save raw materials while ensuring performance, the prepared polymer film has higher UV shielding efficiency, wider range, easy processing, uniform texture, and better mechanical properties, easy to process, and wider application range.

BRIEF DESCRIPTION OF THE DRAWINGS

The present invention will be further described below accompanying with the drawings and the embodiments. In the drawings.

PREFERRED EMBODIMENTS OF THE INVENTION

1. Polymer and Preparation Method Thereof

Example 1.1

5 g of methyl methacrylate, 0.1 g of ethylene glycol pyridone acid methacrylate, 0.1 g of methyl 4-methacrylamido benzoate, 5 mg of azobisisobutyronitrile, and 30 ml of toluene were mixed uniformly under stirring, the system was sealed after nitrogen was introduced for 20 min, and reacted at 90° C. for 12 h. The product was subjected to rotary evaporation, dissolution-precipitation treatment to obtain a pure terpolymer.

Example 1.2

5 g of methyl methacrylate, 0.5 g of ethylene glycol pyridone acid methacrylate, 0.5 g of methyl 4-methacrylamido benzoate, 10 mg of benzoyl peroxide, and 30 ml of tetrahydrofuran were mixed uniformly under stirring, argon was introduced for 15 min, and reflux condensation reaction was carried at 85° C. for 12 h. The product was subjected to rotary evaporation, water washing, suction filtration, and drying treatment to obtain a pure terpolymer.

Example 1.3

5 g of methyl methacrylate, 0.5 g of ethylene glycol pyridone acid methacrylate, 0.5 g of methyl 4-methacrylamido benzoate, 10 mg of benzoyl peroxide, and 30 ml of toluene were mixed uniformly under stirring, the system was sealed after argon was introduced for 130 min, and reacted at 85° C. for 24 h. The product was subjected to rotary evaporation, and vacuum drying treatment to obtain a pure terpolymer.

2. Polymer Film and Preparation Method Thereof

Example 2.1

Figure 4:
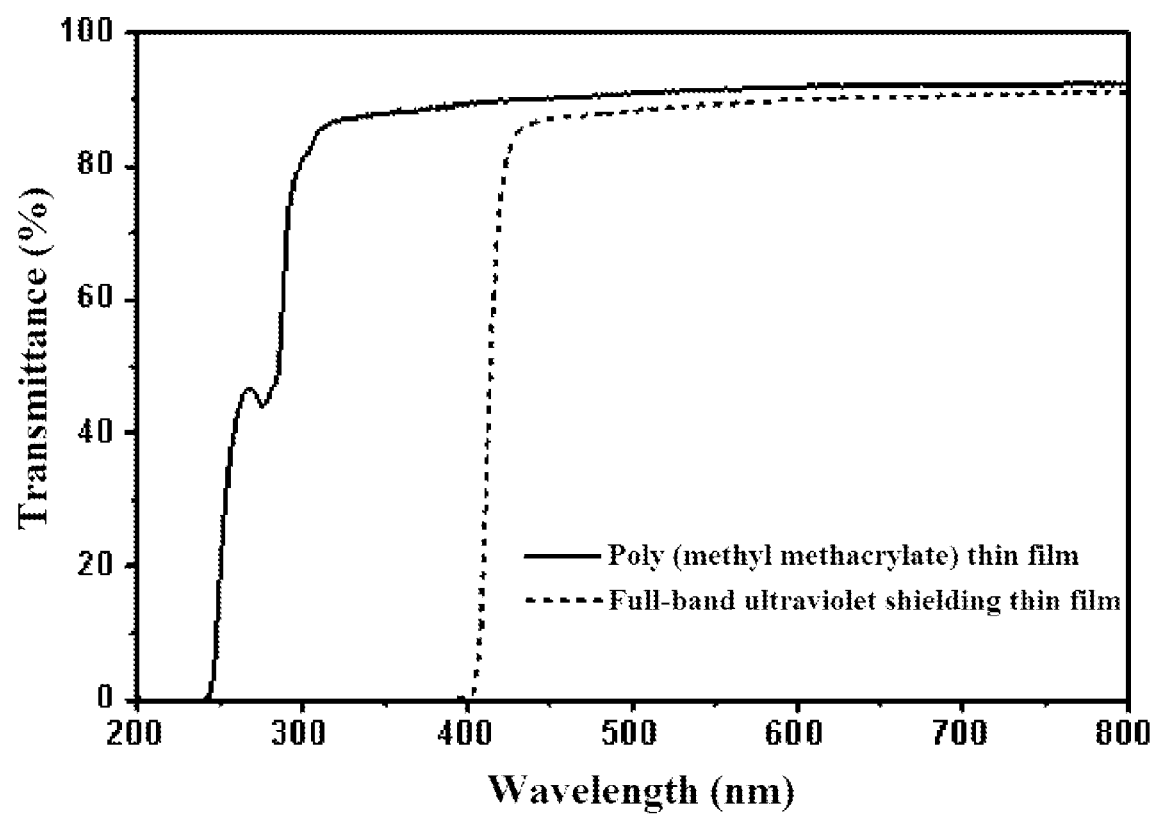
FIG. 4 is a test diagram of the ultraviolet transmittance of the polymer film and the poly (methyl methacrylate) thin film according to an embodiment of the present invention.

5 g of terpolymer was dissolved in toluene under stirring at 60° C. to obtain a solution, the obtained solution was poured into a glass tank, dried at 25° C. for 18 h, and finally a film was removed to obtain a full-band ultraviolet shielding thin film. The polymer film was subjected to an ultraviolet absorption test. The result was shown in FIG. 4: the ultraviolet absorption range of the film covered 200-400 nm, and the absorption efficiency was extremely high.

Example 2.2

5 g of terpolymer was dissolved in toluene under stirring at 60° C. to obtain a solution, the obtained solution was poured into a glass tank, dried at 40° C. for 12 h, and finally a film was removed to obtain a full-band ultraviolet shielding thin film.

Example 2.3

5 g of terpolymer was dissolved in dichloromethane under stirring at 60° C. to obtain a solution, the obtained solution was poured into a glass tank, dried at 60° C. for 8 h, and finally a film was removed to obtain a full-band ultraviolet shielding thin film.

3. UV Absorber Polymer Monomer

Comparative Example 1

Figure 1:
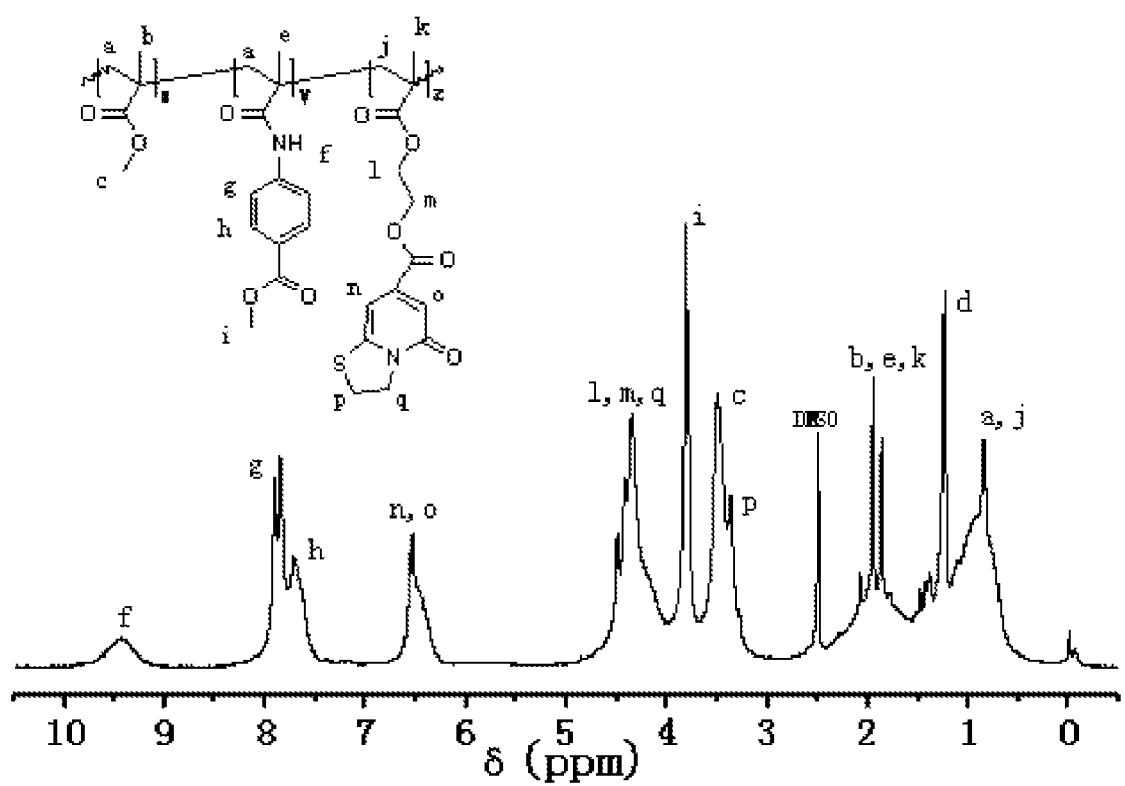
FIG. 1 is a nuclear magnetic resonance spectrum of a terpolymer according to an embodiment of the present invention.
Figure 2:
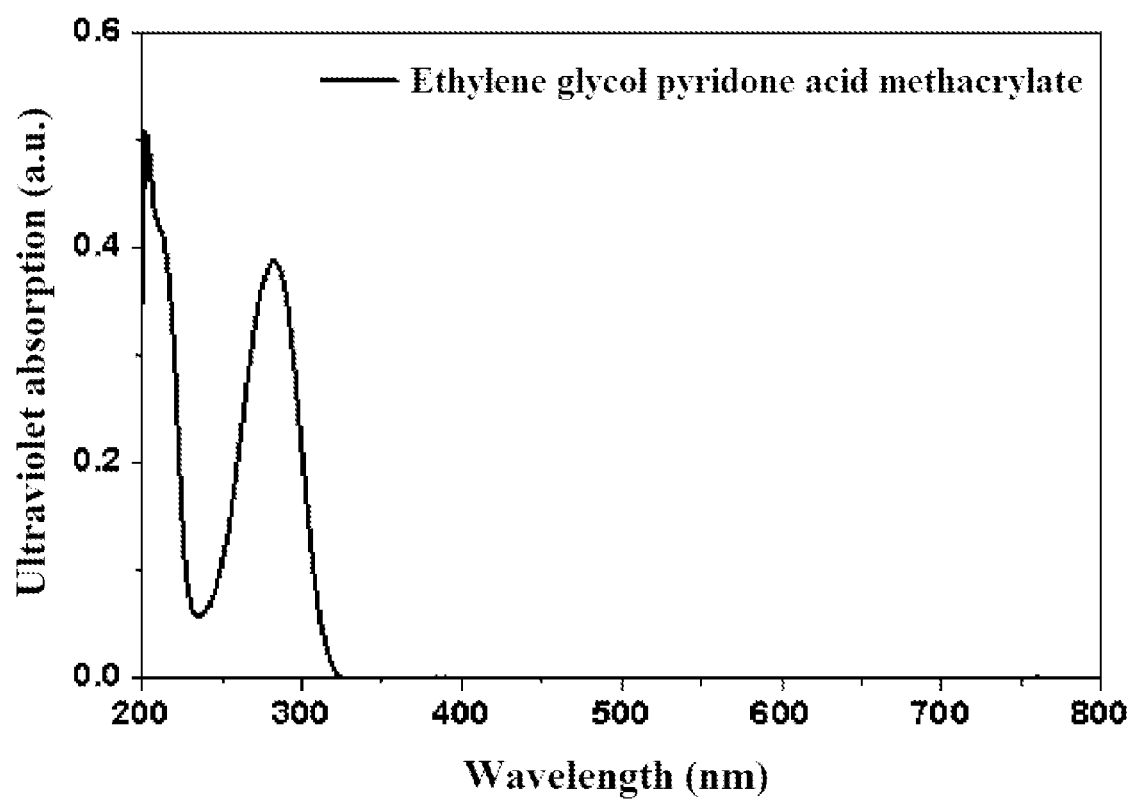
FIG. 2 is an ultraviolet absorption test diagram of ethylene glycol pyridone acid methacrylate according to an embodiment of the present invention.

10 mmoles of pyridone acid, 20 mmoles of 1-(3-dimethylaminopropyl)-3-ethylcarbodiimide hydrochloride, 1 mmoles of 4-dimethylaminopyridine, and 50 ml of dichloromethane were mixed uniformly under stirring, and 15 mmoles of hydroxyethyl methacrylate was added after 2 h, reacted for 12 h at room temperature, and extracted to obtain an ethylene glycol pyridone acid methacrylate monomer. The monomer was subjected to an ultraviolet absorption test, and the test result was shown in FIG. 2.

Comparative Example 2

Figure 3:
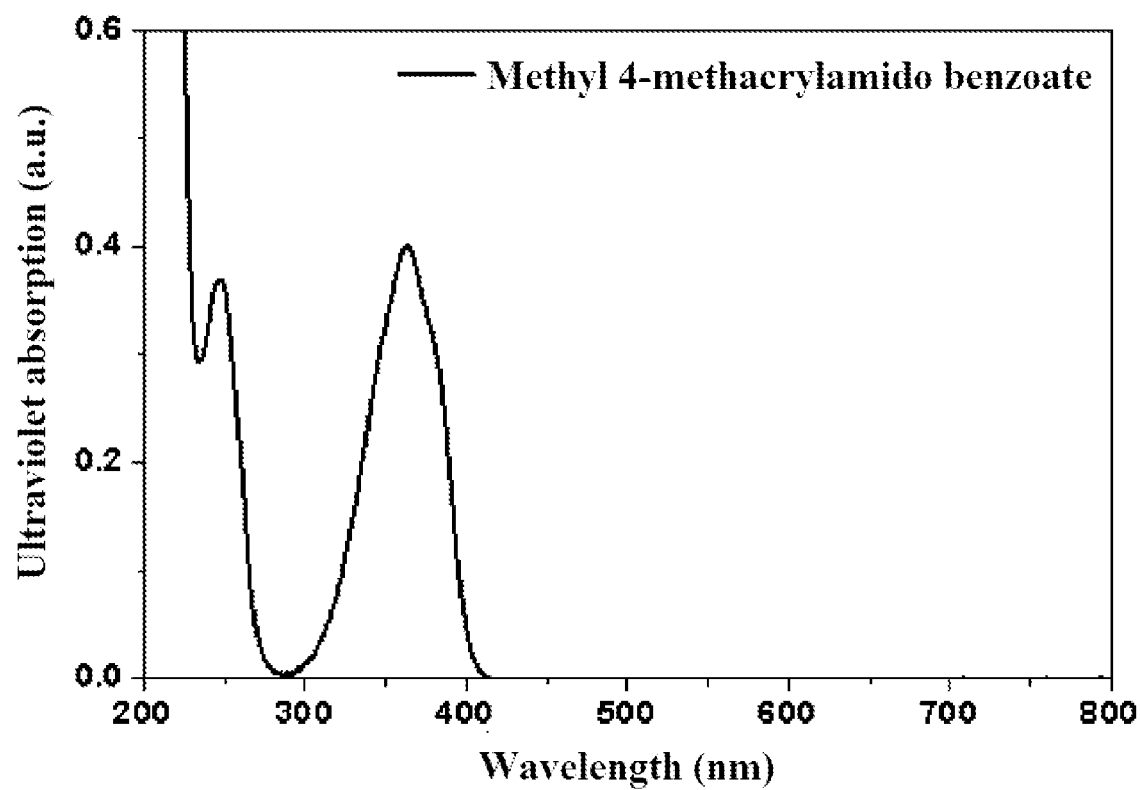
FIG. 3 is an ultraviolet absorption test diagram of methyl 4-methacrylamido benzoate according to an embodiment of the present invention.

10 mmoles of methyl 4-aminobenzoate, 15 mmoles of methacrylic anhydride, 1 mmole of 4-dimethylaminopyridine, and 50 ml of dichloromethane were mixed uniformly under stirring, reacted for 12 h at room temperature, and extracted to obtain a methyl 4-methacrylamido benzoate monomer. The monomer was subjected to an ultraviolet absorption test, and the test result was shown in FIG. 3.

The above-mentioned examples are only preferred embodiments of the present invention, and are not intended to limit the present invention. Any modification, equivalent replacement and improvement made within the spirit and principle of the present invention all fall into the protection scope of the present invention.

Examples of the Invention

Embodiments of the Invention

To describe the technical problems, technical solutions, and beneficial effects of the present invention more clearly, the following further detail description will be given accompanying with the embodiments. It should be understood that the specific embodiments described below are only used to explain the present invention, but not to limit the present invention.

In one aspect, the embodiment of the present invention provides a polymer. The polymer is made by polymerization of methyl methacrylate, ethylene glycol pyridone acid methacrylate, and methyl 4-methacrylamido benzoate in a mass ratio of 1:(0.01-10):(0.01-10). The single polymer formed by copolymerization makes the polymer uniform in texture. There is no need to take into account the physical and chemical properties of multiple polymers, which makes the polymer easier to process and has higher shielding efficiency. Therefore, the same performance can be achieved with fewer raw materials, which indirectly saves raw materials.

In another aspect, the present invention provides a method for preparing the polymer as follows.

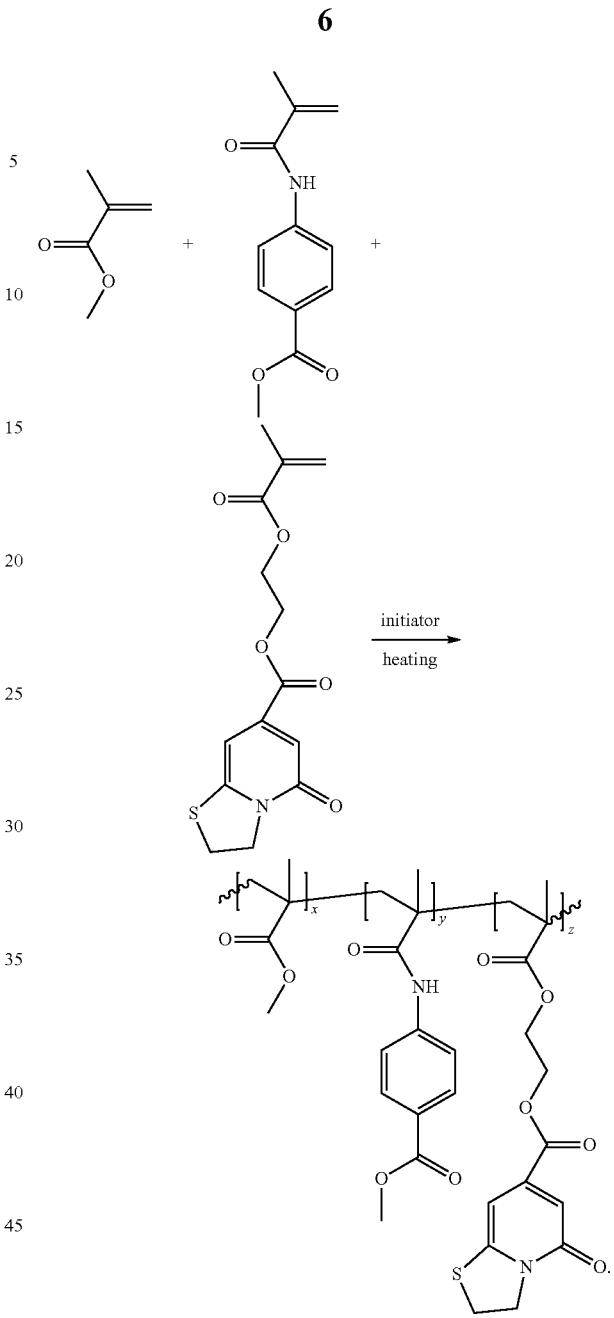

The polymer is prepared by copolymerization of three monomers in one step. The process is simplified, and the performance of the prepared polymer is also improved, which is more convenient for further processing. The specific method for preparing the polymer comprises the following steps:

S01: methyl methacrylate, ethylene glycol pyridone acid methacrylate, methyl 4-methacrylamido benzoate, and a trace amount of initiator were dissolved in a solvent according to the mass ratio 1:(0.01-10):(0.01-10) in a solvent to carry out polymerization reaction to obtain a copolymer.

S02: the copolymer is separated and purified.

Specifically, the temperature of the polymerization reaction is in a range from 50° C. to 100° C. This temperature is selected to control the polymerization reaction rate to an appropriate level, which will not cause uncontrollable development of the reaction due to overheating caused by too fast reaction, and will not cause too slow reaction rate due to too low temperature.

Specifically, the reaction time of the polymerization reaction is in a range from 2 h to 36 h. The reaction time was set after monitoring different reaction temperatures, so that the reaction was completed.

Specifically, the initiator in step S01 comprises one or more of cyclohexanone peroxide, benzoyl peroxide, lauroyl peroxide, cumyl hydroperoxide, dicyclohexyl peroxydicarbonate, potassium persulfate, ammonium persulphate, azodiisobutyronitrile. These are all commonly used initiators. The polymerization method will change with different polymerization degrees of the initiator, and an appropriate initiator can be selected according to specific needs.

Specifically, the solvent in step S01 comprises one or more of acetone, ethanol, dichloromethane, ethyl acetate, tetrahydrofuran, toluene. A suitable solvent can be selected according to the solubility of the polymer, so that the polymer can meet the requirements for the solubility and the convenience of purification and film formation.

Specifically, the protective gas in step S01 comprises one or more of carbon dioxide, nitrogen, argon. Different shielding gases can be selected according to different needs. In most cases, low-priced nitrogen can be selected. When polymers with higher performance requirements are required, argon having higher price and better performance can be selected.

Specifically, the separation and purification treatment in step S02 comprises any one or more of concentration, dissolution-precipitation, water washing, centrifugation and suction filtration. More specifically, in an embodiment, the polymer is first concentrated and then added to the solvent to dissolve and precipitate a terpolymer.

Based on the above polymer and the preparation method thereof, the embodiment of the present invention provides a polymer film. Due to the use of the polymer, the polymer film of the example of the present invention has excellent ultraviolet shielding performance, can be processed into a thinner film while maintaining the ultraviolet shielding performance, and has higher practicability. Moreover, due to the uniform texture, the film can be processed into a film with a simpler process.

The thickness of the polymer film in the example of the present invention is generally 10-1000 μm. Too much thickness wastes raw materials and also reduces the transmittance of other visible lights, and too thin thickness cannot achieve the effect of ultraviolet shielding.

In another aspect, the present invention provides a method for preparing the polymer film, which comprises the following steps:

A01: dissolving the polymer of claim 1 in a solvent to obtain a solution; and

A02: pouring the obtained solution into a container and drying at 25-60° C. for 8-24 h to obtain the film.

Specifically, the solution in step A01 has a concentration of ranging from 1 wt % to 30 wt %. Solution of this concentration range can make the solution have a certain viscosity after pouring, it will not be too dilute to form a film, and the concentration will not be too large, which will cause the film thickness to be uneven before being uniformly spread.

Specifically, the solvent in step A01 comprises one or more of acetone, ethanol, dichloromethane, ethyl acetate, tetrahydrofuran, toluene. The selection of solvent is considered comprehensively according to the dissolution situation in the preparation and the actual market price situation.

Specifically, the drying temperature in step A02 can make the organic solvent volatilize as soon as possible, and the polymer film will not be unable to be cured due to too high temperature.

The polymer has good ultraviolet shielding performance and various beneficial physical properties, and can be widely used in preparing ultraviolet shielding materials or device.

The invention claimed is:

1. A polymer, wherein the polymer is made by polymerization of methyl methacrylate, ethylene glycol pyridone acid methacrylate, and methyl 4-methacrylamido benzoate,
   wherein a mass ratio of the methyl methacrylate, the ethylene glycol pyridone acid methacryalate and the methyl 4-methacrylamido benzoate is 1: (0.01-10): (0.01-10).

2. A polymer film prepared from the polymer of claim 1.

3. A method for preparing the polymer of claim 1, comprising the following steps:
   dissolving methyl methacrylate, ethylene glycol pyridone acid methacrylate, methyl 4-methacrylamido benzoate and an initiator according to the mass ratio 1:(0.01-10): (0.01-10) in a solvent to carry out polymerization reaction, wherein the initiator is not less than 5 mg; and
   separating and purifying the copolymer.

4. The method for preparing the polymer of claim 3, wherein the temperature of the polymerization reaction is in a range from 50° C. to 100° C.

5. The method for preparing the polymer of claim 3, wherein the reaction time of the polymerization reaction is in a range from 2 h to 36 h.

6. The method for preparing the polymer of claim 3, wherein the initiator comprises one or more of cyclohexanone peroxide, benzoyl peroxide, lauroyl peroxide, cumyl hydroperoxide, dicyclohexyl peroxydicarbonate, potassium persulfate, ammonium persulphate, azodiisobutyronitrile; and/or
   the solvent comprises one or more of acetone, ethanol, dichloromethane, ethyl acetate, tetrahydrofuran, toluene; and/or
   a protective gas comprises one or more of carbon dioxide, nitrogen, and argon.

7. The method for preparing the polymer of claim 3, wherein the separation and purification treatment comprises any one or more of concentration, dissolution-precipitation, water washing, centrifugation and suction filtration.

8. The method for preparing the polymer of claim 3, further comprising the following steps:
   dissolving the polymer of claim 1 in a solvent to obtain a solution; and
   coating the solution into a film, and then drying to form the polymer film.

9. The method for preparing the polymer film of claim 8, wherein the solution has a concentration of ranging from 1 wt % to 30 wt %.

* * * * *